Nov. 26, 1946. A. W. GARDES 2,411,782
HEATER ATTACHMENT FOR FANS
Filed April 1, 1944 2 Sheets-Sheet 1
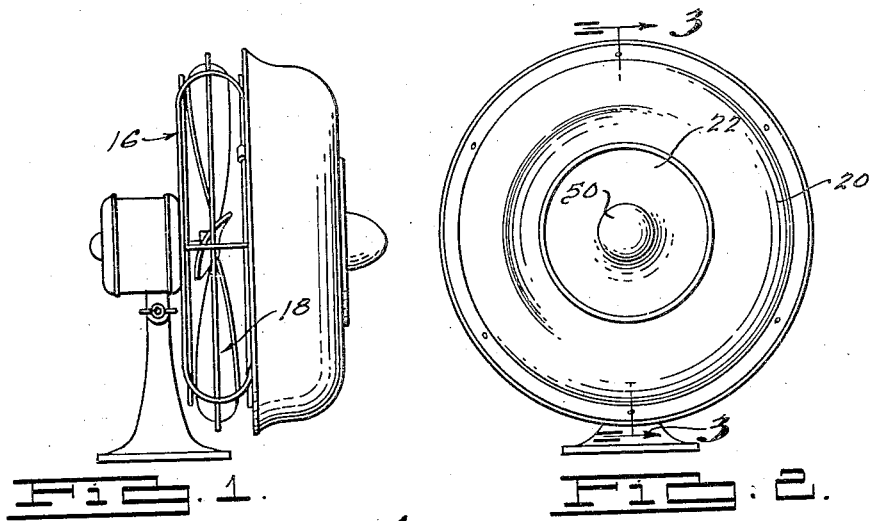
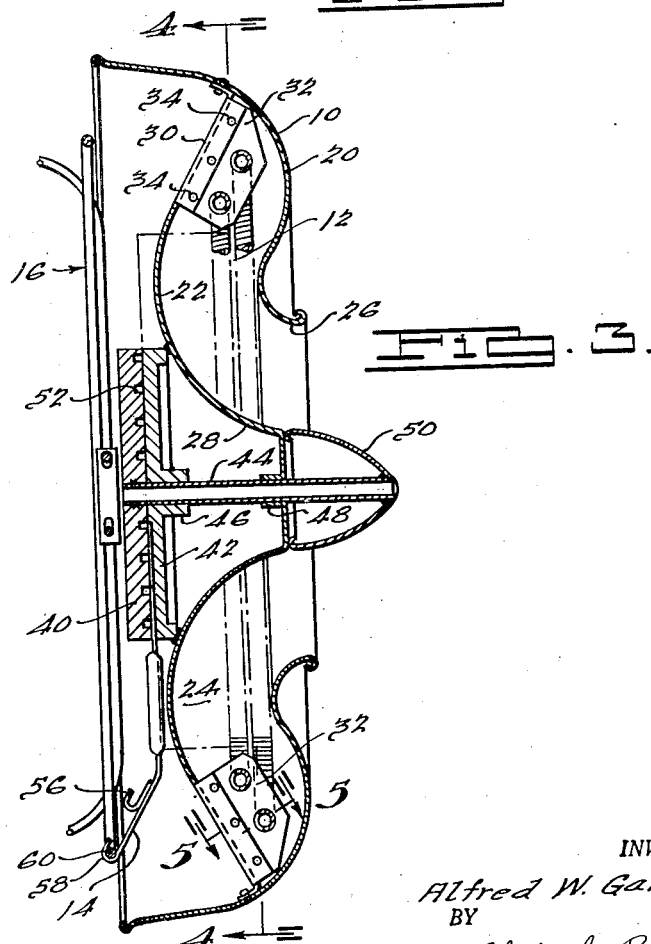
INVENTOR.
Alfred W. Gardes.
BY
Edwin J. Balliff
ATTORNEY.

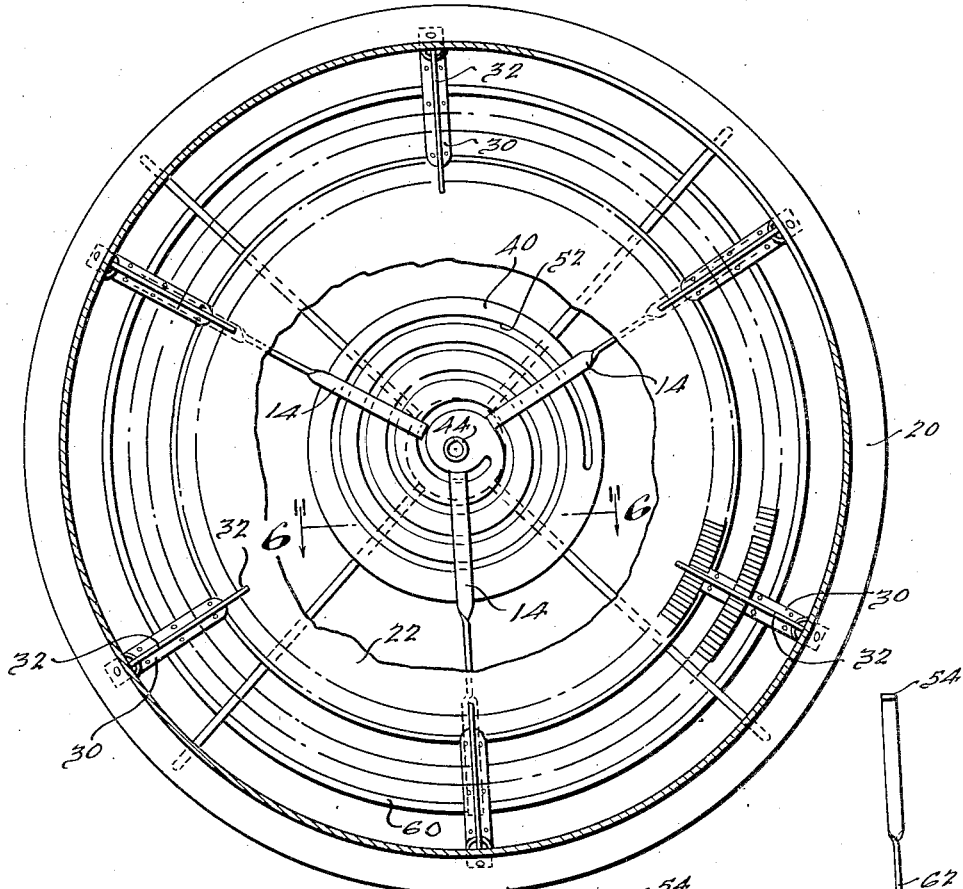

Patented Nov. 26, 1946

2,411,782

UNITED STATES PATENT OFFICE 2,411,782

HEATER ATTACHMENT FOR FANS

Alfred W. Gardes, Detroit, Mich., assignor to McCord Corporation, a corporation of Maine Application April 1, 1944, Serial No. 529,208

7 Claims. (Cl. 219—39)

This invention relates to heater attachments for fans.

A principal object of the invention is to provide an electric heater attachment adapted for use in connection with various sized fans for heating the air discharged therefrom.

Another object of the invention is to provide a heater attachment for fans with adjustable attaching means which make it useful in connection with a wide range of sizes and styles of fans.

Other objects and advantages of the invention will be apparent from a consideration of the following specification taken in conjunction with the accompanying drawings of which there are two sheets and wherein:

Fig. 1 is a side elevational view of a device embodying the invention assembled to a fan;

Fig. 2 is a front elevational view;

Fig. 3 is a sectional view taken along the line 3—3 of Fig. 2;

Fig. 4 is a sectional view taken along the staggered line 4—4 of Fig. 3;

Fig. 5 is a sectional view taken along the line 5—5 of Fig. 3;

Fig. 6 is a sectional view taken along the line 6—6 of Fig. 4; and

Figs. 7 and 8 are side and front elevational views of one of the mounting hooks.

The attachment in general comprises a casing 10, an electric resistance heating element 12, and a series of adjustable hook members 14 by means of which the attachment may be detachably connected to the guard 16 of an electric motor-driven air circulating fan indicated generally at 18.

The casing comprises outer and inner shields or shells 20 and 22 arranged in spaced relation and so as to form an annular air conducting path or channel 24. The outer shell 20 is circular and shaped in the form of a bowl with the large open end thereof presented toward the fan 18. The center of the outer shell 20 at the other end thereof is formed to provide a circular opening 26 through which air is discharged. The inner shell 22 is generally saucer shaped with the periphery thereof spaced from the surrounding wall of the outer shell 20. At its center the inner shell 22 may be provided with a hub 28 which projects toward the outlet 26. The opposed surfaces of the outer and inner shells 20 and 22 cooperate to define an annular air passageway for conducting air discharged by the fan over the heating element 12 and to the outlet 26 where it is discharged in a direction axially of the fan and away therefrom.

A series of struts 30 extend across the space between the outer periphery of the inner shell 22 and the inside wall of the outer shell 20 and are suitably secured to both of said shells for supporting the shells relative to one another. The struts 30, as illustrated in Fig. 5, may present a streamlined shape toward the air discharged by the fan. Each of the struts 30 is formed to support an insulator 32 which projects in the direction of air flow and which is secured to the strut by means of a series of rivets 34. The insulators 32 form a support for the electric resistance heating element 12 which may comprise one or more coils of electric resistance wire supported in suitable openings provided by the insulators 32. Thus the electric resistance heating element is supported in the air passageway 24 and is arranged to dissipate heat to the air which is circulated therethrough.

The electric resistance heating element 12, like the motor of the fan, is adapted to be supplied with current from a suitable source, and preferably the supply of current to the heating element 12 is arranged under the control of a relay or thermostatic switch so that the supply of current to the heating element will be cut off or limited except when the fan is operating.

As previously indicated, this heater attachment is provided with adjustable means including the hook members 14 by means of which the same may be readily attached to and detached from fans of various sizes. The attaching mechanism comprises, in addition to the hook members 14, a rotary disk 40 and a stationary disk 42, the stationary disk 42 being suitably supported on the rear face of the shell 22 at the center thereof. The rotary disk 40 is fixed to one end of a shaft 44 so as to rotate therewith, such shaft being supported at one end in a bearing formed by the hub 46 of the stationary disk 42 and at the other end in a bearing 48 which, as illustrated, may be formed by portions of the shell 22 at the center thereof. The shaft 44 extends forwardly of the shell 22 and through the discharge outlet 26 where it is provided with a knob 50 the outer surface of which may be shaped to form a continuation of the adjacent surfaces of the shell 22. The disk 40 is provided with a spiral track 52.

The inner ends 54 of each of the hook members 14 are bent laterally relative to the hook and arranged in the track or groove 52 as illustrated in Fig. 4. Preferably the length of each hook member 14 is such that when arranged in a radial position, as illustrated in Fig. 4, and with the inner end 54 thereof arranged in the track 52, the hooks 56 of each of the members 14 will be substantially uniformly spaced with respect to the shaft 44 which is at the center of the attachment and adapted to be aligned with the axis of the fan. Each of the hook members 14 may also be provided with another hook 58 at the outer extremity thereof and these hooks, like the hooks 56, are adapted to be uniformly spaced relative to the shaft 44. The hooks 56 and 58 are adapted for engagement with the wire guard 16 of the fan, that is, all of the hooks 58 may be engaged with a circular member 60 of the guard 16, as illustrated in Fig. 3, or all of the hooks 56 may be engaged with such circular member 60, depending upon the position in which the adjusting means is arranged.

The hook members 14 are slidably mounted in suitable radially extending guides in disk 42 and may be formed of strips of metal having portions 62 and 64 arranged at right angles relative to each other so that the hook member 14 may be bent in a radial plane relative to the shaft 44 or in a plane normal thereto in order that the hooks 56 or 58 may be adequately engaged with suitable portions of the guards 16 of the fan.

It will be appreciated that as the disk 40 is rotated in a counterclockwise direction, (by means of knob 50), looking at Fig. 4, that the hook members 14 will move radially outwardly relative to the shaft 44. Clockwise rotation of the disk 40 will move the hook members 14 radially inwardly. Thus by means of the knob 50 which is accessible from the front of the attachment, the hooks 56 and 58 may be expanded sufficiently to be in position to engage a suitable part of the guard 16 of the fan (assuming that the attachment has its rear face positioned adjacent the guard 16 of the fan and is arranged substantially co-axially therewith). Thereafter by rotation of the knob 50 the hooks 56 and 58 may be selectively engaged with the guard of the fan for securely clamping the attachment to the face of the fan.

The diameter of the shells 20 and 22 is sufficiently large so as to be useful in connection with the various sizes of fans commonly used in homes and offices, and with the adjustable attaching means herein disclosed the attachment may be readily assembled to and disassembled from any of such fans. The inner shell 22, in addition to forming a part of the air passage in which the heating element 12 is arranged, functions to limit the amount of air discharged by the fan which can pass over the heating element 12.

These heating elements 12 preferably are of a limited size because of the current conducting capacity of most household wiring systems, and in order to obtain the discharge of a blast of heated air from the outlet 26, the inner shell 22 is utilized as a baffle to limit the air flow through the passage 24 to an amount which will insure the discharge of a blast of heated air through the outlet 26 when the attachment is operating in an ambient temperature of the order commonly maintained in homes, offices, and other enclosures inhabited or used by human beings.

Of course the attachment may be designed to operate under any special set of conditions where such may be desired, but I contemplate that this attachment is primarily useful as an auxiliary heater for use in homes, offices, etc., and for this purpose it is necessary to limit the air flow through the passage 24 in view of the fact that the attachment is useful in connection with various sizes of fans which may vary considerably in capacity.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. An electric heater attachment adapted to be readily removably attached to the guard of an air circulating fan, said attachment comprising a casing providing a passage through which air is circulated by said fan during operation thereof, an electric resistance heating element arranged in said passage and operable for heating the air circulated therethrough by said fan, a plurality of radially extensible hooks carried by said attachment and adapted for engagement with the guard of a fan for holding said casing assembled to a fan in such a manner that the inlet to said passage is presented toward the discharge from said fan, and mechanism for adjustably connecting said hooks to said casing, including a knob for actuating said mechanism to extend or contract said hooks, said knob being accessible from the side of said casing opposite said fan.

2. An electric heater attachment adapted to be readily removably attached to the guard of an air circulating fan, said attachment comprising a casing providing a passage through which air is circulated by said fan during operation thereof, said passage having a discharge outlet in the front of said casing, an electric resistance heating element arranged in said passage and operable for heating the air circulated therethrough by said fan, a plurality of radially extending members adapted for engagement with the guard of a fan for holding said casing assembled to a fan in such a manner that the inlet to said passage is presented toward the discharge from said fan, and mechanism for adjustably connecting said members to said casing comprising a rotary member having a spiral track, parts of said radially extending members cooperating with said track for moving the fan guard engaging portions of such members radially upon rotation of said members.

3. An electric heater attachment adapted to be readily removably attached to the guard of an air circulating fan, said attachment comprising a casing providing a passage through which air is circulated by said fan during operation thereof, said passage having a discharge outlet in the front of said casing, an electric resistance heating element arranged in said passage and operable for heating the air circulated therethrough by said fan, a plurality of radially extending members adapted for engagement with the guard of a fan for holding said casing assembled to a fan in such a manner that the inlet to said passage is presented toward the discharge from said fan, mechanism for adjustably connecting said members to said casing comprising a rotary member having a spiral track, parts of said radially extending members cooperating with said track for moving the fan guard engaging portions of such members radially upon rotation of said members, and a knob for operating said rotary member and located at the front of said casing.

4. An electric heater attachment adapted to be readily removably attached to the guard of an air circulating fan, said attachment comprising spaced inner and outer casing members providing a passage through which air is circulated by said fan during operation thereof, said outer casing member being bowl shaped and having its open side presented toward a fan, a circular discharge outlet formed in the center of said outer casing member, spacers in said passage connecting said inner and outer casing members, an electric resistance heating element arranged in said passage and mounted on said spacers and operable for heating the air circulated through the passage by said fan, said inner and outer casing members being shaped to direct air discharged from the fan over said heating element, a plurality of radially extending hooks adapted for engagement with the guard of a fan for holding said casing assembled to a fan in such a manner that the inlet to said passage is presented toward the discharge from said fan, and mechanism for adjustably connecting said hooks to said casing.

5. An electric heater attachment adapted to be readily removably attached to the guard of an air circulating fan, said attachment comprising spaced inner and outer casing members providing a passage through which air is circulated by said fan during operation thereof, said outer casing member being bowl shaped and having its open side presented toward a fan, a circular discharge outlet formed in the center of said outer casing member, spacers in said passage connecting said inner and outer casing members, an electric resistance heating element arranged in said passage and mounted on said spacers and operable for heating the air circulated through the passage by said fan, said inner and outer casing members being shaped to direct air discharged from the fan over said heating element, a plurality of radially extensible and contractible hooks adapted for engagement with the guard of a fan for holding said casing assembled to a fan in such a manner that the inlet to said passage is presented toward the discharge from said fan, mechanism for adjustably connecting said hooks to said casing, and a knob projecting forwardly from said inner casing member at the center thereof for operating said mechanism.

6. An electric heater attachment adapted to be readily removably attached to the guard of an air circulating fan, said attachment comprising a casing providing an annular converging passage through which air is circulated by said fan during operation thereof, the inlet end of said passage being disposed adjacent the periphery of said casing and the discharge end being disposed at the center of said casing, an electric resistance heating element arranged in said passage and operable for heating the air circulated therethrough by said fan, a plurality of radially extensible hooks adapted for engagement with the guard of a fan for holding said casing assembled to a fan in such a manner that the inlet to said passage is presented toward the discharge from said fan, and mechanism for adjustably connecting said hooks to said casing.

7. An electric heater attachment adapted to be readily removably attached to the guard of an air circulating fan, said attachment comprising a casing providing a passage through which air is circulated by said fan during operation thereof, said passage having a discharge outlet in the front of said casing, an electric resistance heating element arranged in said passage and operable for heating the air circulated therethrough by said fan, said attachment having a plurality of flexible members provided with hooks adapted for engagement with the guard of a fan for holding said casing assembled to a fan in such a manner that the inlet to said passage is presented toward the discharge from said fan, some of said members having at the outer end thereof two hooks arranged at right angles to each other and being constructed and arranged so as to be bendable in the planes of said hooks.

ALFRED W. GARDES.